(12) United States Patent
Eickhoff et al.

(10) Patent No.: US 8,871,398 B2
(45) Date of Patent: Oct. 28, 2014

(54) SOLID OXIDE FUEL CELL

(71) Applicant: Honeywell International Inc., Morrsitown, NJ (US)

(72) Inventors: Steven J. Eickhoff, Brooklyn Park, MN (US); Chunbo Zhang, Manhattan Beach, CA (US)

(73) Assignee: Honeywell International Inc., Morristown, NJ (US)

(\*) Notice: Subject to any disclaimer, the term of this patent is extended or adjusted under 35 U.S.C. 154(b) by 0 days.

(21) Appl. No.: 14/084,438

(22) Filed: Nov. 19, 2013

(65) Prior Publication Data
US 2014/0080020 A1 Mar. 20, 2014

Related U.S. Application Data

(62) Division of application No. 11/871,573, filed on Oct. 12, 2007, now Pat. No. 8,614,022.

(51) Int. Cl.
*H01M 8/04* (2006.01)
*H01M 8/06* (2006.01)
*H01M 8/18* (2006.01)
*H01M 8/12* (2006.01)

(52) U.S. Cl.
CPC .............. *H01M 8/18* (2013.01); *H01M 8/065* (2013.01); *Y02E 60/525* (2013.01); *H01M 2008/1293* (2013.01); *Y02E 60/50* (2013.01); *H01M 8/04201* (2013.01); *H01M 8/04307* (2013.01)
USPC .......................................... 429/417; 429/427

(58) Field of Classification Search
USPC ............. 429/465, 491, 477, 9, 442, 417, 427, 429/428
See application file for complete search history.

(56) References Cited

U.S. PATENT DOCUMENTS

| 8,614,022 B2 | 12/2013 | Eickhoff et al. |
| 2005/0037245 A1 | 2/2005 | Pham |
| 2005/0196659 A1 | 9/2005 | Grieve et al. |
| 2006/0090397 A1* | 5/2006 | Edlund et al. ................ 48/61 |
| 2007/0026285 A1* | 2/2007 | Wang et al. ................. 429/33 |
| 2007/0166586 A1* | 7/2007 | Marchand et al. ........... 429/25 |
| 2011/0286884 A1* | 11/2011 | Eickhoff et al. ............. 422/54 |

FOREIGN PATENT DOCUMENTS

| EP | 1675200 A2 | 6/2006 |
| WO | WO-2006041854 A2 | 4/2006 |

OTHER PUBLICATIONS

"U.S. Appl. No. 11/871,573, Response filed Apr. 19, 2013 to Non Final Office Action mailed Jan. 22, 2013", 13 pgs.
"U.S. Appl. No. 11/871,573, Response filed Oct. 9, 2012 to Final Office Action mailed Oct. 1, 2012", 12 pgs.
"U.S. Appl. No. 11/871,573, Advisory Action mailed Nov. 5, 2012", 3 pgs.
"U.S. Appl. No. 11/871,573, Final Office Action mailed May 22, 2013", 14 pgs.

(Continued)

*Primary Examiner* — Mark F Huff
*Assistant Examiner* — Monique Wills
(74) *Attorney, Agent, or Firm* — Schwegman Lundberg & Woessner, P.A.

(57) ABSTRACT

A power generator includes a hydrogen generator that generates hydrogen in response to water vapor. A solid oxide fuel cell is coupled to the hydrogen generator for receiving hydrogen and is coupled to a source of oxygen.

15 Claims, 3 Drawing Sheets

(56) References Cited

OTHER PUBLICATIONS

"U.S. Appl. No. 11/871,573, Final Office Action mailed Oct. 1, 2012", 11 pgs.
"U.S. Appl. No. 11/871,573, Non Final Office Action mailed Jan. 22, 2013", 12 pgs.
"U.S. Appl. No. 11/871,573, Non Final Office Action mailed Jun. 22, 2012", 9 pgs.
"U.S. Appl. No. 11/871,573, Notice of Allowance mailed Aug. 20, 2013", 9 pgs.
"U.S. Appl. No. 11/871,573, Response filed Jan. 2, 2013 to Final Office Action mailed Oct. 1, 2012", 13 pgs.
"U.S. Appl. No. 11/871,573, Response filed Mar. 7, 2012 to Restriction Requirement mailed Feb. 7, 2012", 5 pgs.
"U.S. Appl. No. 11/871,573, Response filed Jul. 22, 2013 to Final Office Action mailed May 22, 2013", 14 pgs.
"U.S. Appl. No. 11/871,573, Response filed Jul. 2, 2012 to Non Final Office Action mailed Jun. 22, 2012", 9 pgs.
"U.S. Appl. No. 11/871,573, Restriction Requirement mailed Feb. 7, 2012", 5 pgs.
"United Kingdom Application Serial No. 0818681, Combined Search and Examination Report mailed Oct. 28, 2008", 4 pgs.
"United Kingdom Application Serial No. 0818681, Response filed Oct. 12, 2009 to Combined Search and Examination Report mailed Oct. 28, 2008", 3 pgs.

* cited by examiner

SOLID OXIDE FUEL CELL

RELATED APPLICATIONS

This application is a divisional of U.S. patent application Ser. No. 11/871,573, filed Oct. 12, 2007, which application is incorporated herein by reference in its entirety.

BACKGROUND

Portable power sources such as batteries and some fuel cells have low energy density and specific energy. Because of this, they do not provide sufficient energy for a long period of time desired for many demanding portable applications.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
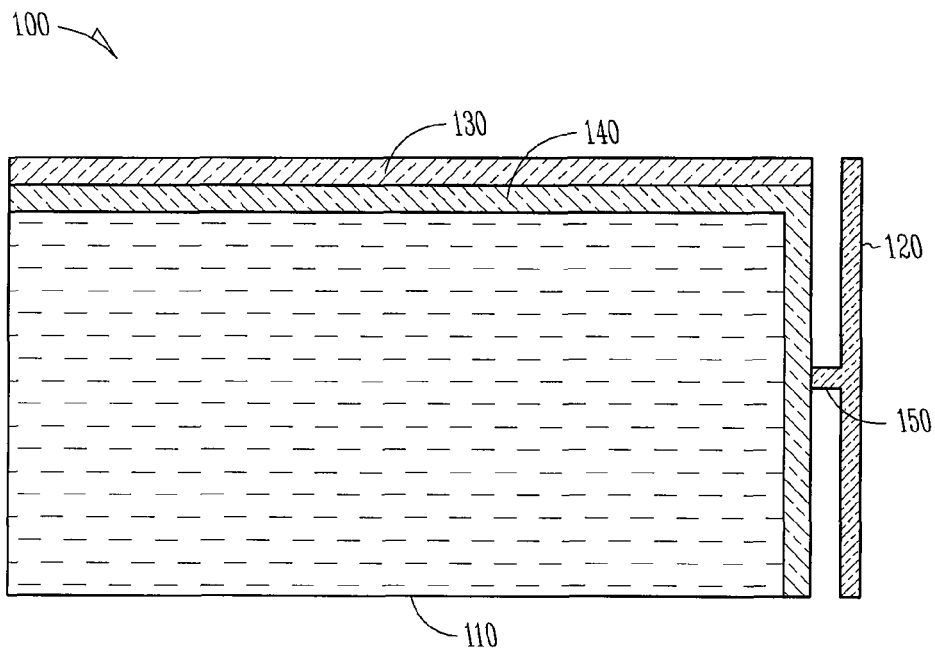
FIG. 1 is a block diagram of a power generator utilizing a solid oxide fuel cell according to an example embodiment.

A portable generator 100 is illustrated in block form in FIG. 1. Portable generator 100 is a weight and volume efficient water-scavenging hydrogen generator 110 coupled to a solid oxide fuel cell 120 to generate electrical power. In one embodiment, the hydrogen generator 110 comprises a material that generates hydrogen when exposed to water. In a further embodiment, it is desirable to provide water vapor to the hydrogen generator 110. Materials which may be used in the hydrogen generator 110 to generate hydrogen non-exclusively include alkali metals, calcium hydride, lithium hydride, lithium aluminum hydride, lithium borohydride, sodium borohydride and combinations thereof. Suitable alkali metals non-exclusively include lithium, sodium and potassium. When contacted with water molecules, these fuels react, releasing hydrogen gas. The fuel may optionally be combined with a hydrogen generation catalyst to catalyze the reaction of the water vapor and the non-fluid substance. Suitable catalysts may non-exclusively include cobalt, nickel, ruthenium, magnesium and alloys and combinations thereof.

Figure 3:
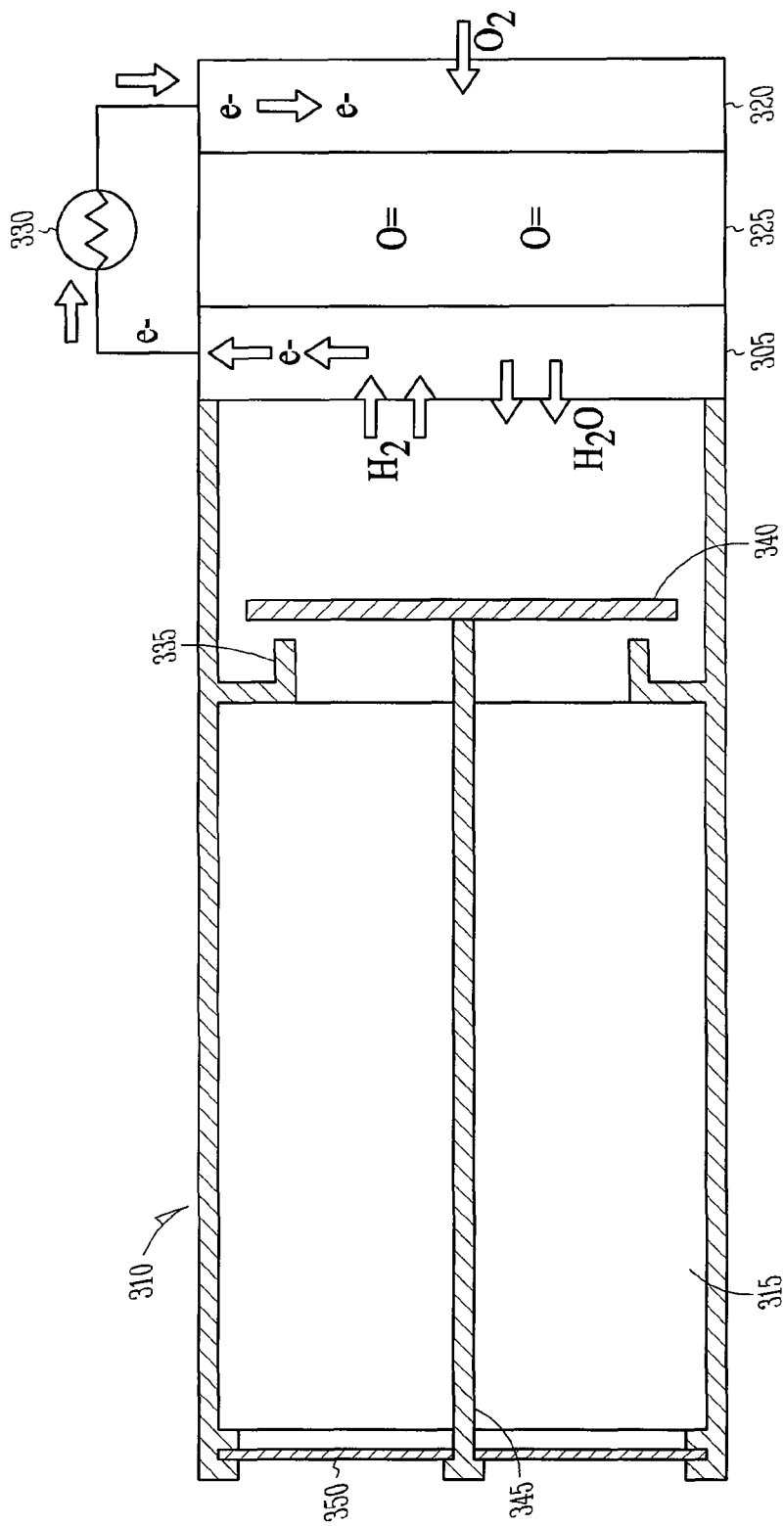
FIG. 3 is a block diagram of an alternative power generator utilizing a solid oxide fuel cell according to an example embodiment.

In one embodiment, a water vapor permeable, hydrogen impermeable membrane 130, such as Nafion is provided between the hydrogen generator and a water vapor source. In further embodiments, various valve arrangements may also be used to control the amount of water vapor supplied to the fuel material responsive to electrical demands placed on the power generator. The water vapor source may be self contained in the power generator (a liquid water source), it may comprise ambient humidity, or as illustrated in FIG. 3 at 300, the water vapor source is the water generated by the fuel cell.

A space 140 may be provided between the membrane 130 and the fuel material to allow for transport of generated hydrogen to the solid oxide fuel cell 120, such as via a passage 150. The hydrogen generator may include a container 160 in further embodiments to hold the fuel material and the membrane 130.

Figure 2:
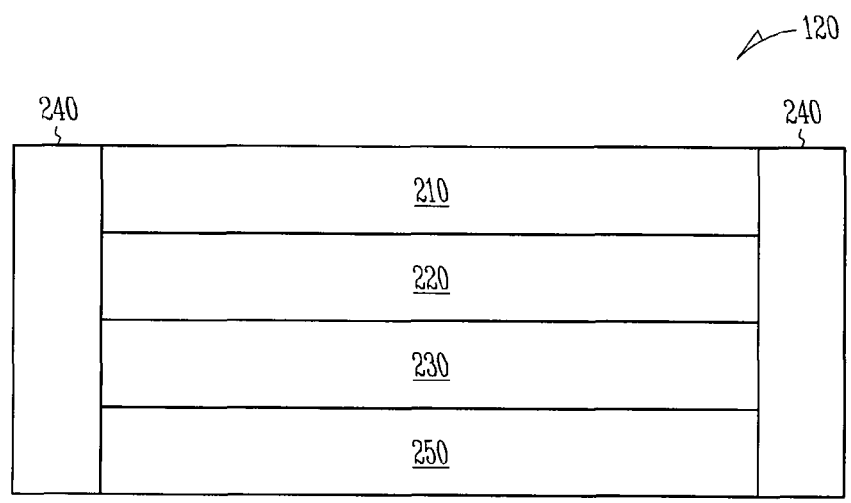
FIG. 2 is a block diagram of a cross section of an oxide fuel cell according to an example embodiment.

In one embodiment, the solid oxide fuel cell 120 is exposed to a source of oxygen, such as air. The solid oxide fuel cell 120 may be in the form of a stack made up of four layers in one embodiment. Three of the layers may be ceramic. A single cell consists of these four layers stacked together and is typically only a few millimeters thick. Hundreds of these layers may be stacked together in series to form the solid oxide fuel cell 120 as shown in further detail in FIG. 2. In some embodiments, the ceramics used become electrically and ionically active when they reach a high temperature, such as 700 to 1200° C.

To reach operating temperature, some of the hydrogen may be "burned" on a catalyst on the exterior of the fuel cell with oxygen from ambient, generating heat. Other heating methods may be employed, such as employing a small rechargeable battery that ohmically heats a wire wrapped around the solid oxide fuel cell. Still other methods of generating heat may be used, such as utilizing heat produced by a load coupled to the power generator.

A cathode layer 210 of the solid oxide fuel cell 120 is porous in one embodiment, such that is allows air flow through it and into an electrolyte. The ceramic materials used for the cathode layer 210 are electrically conductive in one embodiment. The cathode layer 210 is a positive side of the fuel cell. Electrons flow toward the cathode. The electrons are used to reduce oxygen molecules to oxygen ions.

An electrolyte 220 is a dense gas tight layer of each cell 120 that acts as a membrane separating the air on the cathode layer 210 from the fuel on an anode layer 230 side. There are many ceramic materials that may be used as an electrolyte. Some common electrolyte materials include zirconium oxide based materials. Besides being air tight, the electrolyte may also be electrically insulating so that the electrons resulting form the oxidation reaction on the anode layer 230 side are forced to travel though an external circuit before reaching the cathode layer 210 side. The electrolyte 220 in one embodiment conducts the oxygen ions from the cathode to the anode. Ionic conductivity is a desirable attribute in selecting a suitable electrolyte.

The ceramic anode layer 230 is very porous in one embodiment such that it allows the hydrogen to flow to the electrolyte. Like the cathode 210, it conducts electricity. One common material for the ceramic anode layer 230 is a cermet made up of nickel mixed with the ceramic material that is used for the electrolyte. The anode is commonly the thickest and strongest layer in each individual cell, and is often a layer that provides mechanical support for the other layers. The anode uses the oxygen ions that diffuse through the electrolyte layer to oxidize the hydrogen fuel. The oxidation reaction between the oxygen ions and the hydrogen produces both water and electricity.

An interconnect 240 may be either a metallic or a ceramic layer that sits between each individual cell. It provides electrically connection of the cells in series. The interconnect in one embodiment is a highly corrosion resistant conductive material, such as gold or some forms of ceramics in various embodiments.

In one embodiment, the water produced by the oxidation reaction between the oxygen ions and the hydrogen is used as a source of water vapor for the hydrogen generator. In one embodiment, a water vapor permeable, hydrogen permeable and liquid water impermeable membrane 250 may be used between the fuel cell and the hydrogen generator together with a pressure controlled valve to control the amount of water vapor provided to the fuel. The membrane 250 in one embodiment is a micro-porous polymeric film. Such polymeric films non-exclusively include mono- and multilayer fluoropolymer containing materials, a polyurethane containing materials, polyester containing materials or polypropylene containing materials. Suitable fluoropolymer containing materials include polytetrafluoroethylene (PTFE) and expanded polytetrafluoroethylene (ePTFE), PFA, FEP. Example fluoropolymer containing materials are films and fabrics commercially available under the Gore-Tex®, eVent® and HyVent® trademarks. Gore-Tex® is an e-PTFE material commercially available from W.L. Gore and Associates of Newark, Del., and eVENT® is a PTFE material manufactured by BHA technologies of Delaware. HyVent® is polyurethane containing material commercially available from The North Face Apparel Corp., of Wilmington, Del.

In an alternative power generator incorporating a solid oxide fuel cell as shown at 300 in FIG. 3, water is generated at an anode 305 (unlike in a PEM (proton exchange membrane) fuel cell, where water is generated at the cathode) and can be used to generate hydrogen by diffusing back to a hydrogen generator 310 and reacting with a hydride fuel 315. This is a significant advantage over PEM fuel cells that use water generated at the fuel cell cathode to generate hydrogen, because in the PEM cell, the water vapor must permeate either through the fuel cell PEM membrane or through some other water vapor permeable membrane before it can react with the hydride fuel. This makes the power output of the PEM fuel cell sensitive to ambient humidity (because the ambient humidity affects the amount of water vapor which permeates back to the hydrogen generator), which is undesirable. Additionally, In the power generator incorporating the solid oxide fuel cell 300, power density is much greater than the PEM cell, making for a more compact high-power power source.

In various example embodiments, the hydrogen fuel 315 may comprise a chemical hydride fuel or chemical hydride/metal hydride mixture to provide sufficient hydrogen for pulses of current that may be needed above a steady state supply that may be provided by solely using a chemical hydride fuel.

In power generator 300, a cathode 320 is exposed to a source of oxygen, such as ambient air or an oxygen supply. An electrolyte 325 separates the cathode 320 from the anode 305. Oxygen atoms move through the electrolyte 325 and combine with hydrogen from the hydrogen generator 310, generating electrons, which may flow back to the cathode 320 through a load indicated at 330.

The hydrogen generator 310 in one embodiment has a valve seat 335 that mates with a valve disc 340. In this embodiment, the valve disc 340 moves transverse to an axis of the fuel cell 300, selectively allowing generated hydrogen to be provided to the anode 305. The valve plate is coupled via a valve pin 345 to a pressure responsive flexible diaphragm 350. As hydrogen is consumed in response to demand from load 330, a difference in pressure may develop across the pressure responsive diaphragm 350. The diaphragm 350 flexes toward the valve seat 335, releasing the valve disc 340 from the seat and allowing water vapor to be transported to the hydrogen generator 310, which in turn generates hydrogen that is transported to the solid oxide fuel cell. As sufficient hydrogen is generated, the pressure difference across the diaphragm 350 equalizes, causing the valve disc 340 to move back towards the valve seat. This results in a self regulating power generator.

In one embodiment, a water vapor permeable, hydrogen permeable and liquid water impermeable membrane may be used between the fuel cell and the hydrogen generator together with a pressure controlled valve to control the amount of water vapor provided to the fuel. The membrane may be adjacent the fuel or adjacent the anode 305 as indicated at 250 in FIG. 2. In further embodiments, the membrane may be positioned somewhere between the anode 305 and fuel 315 to prevent liquid water from reaching the fuel 315.

Figure 4:
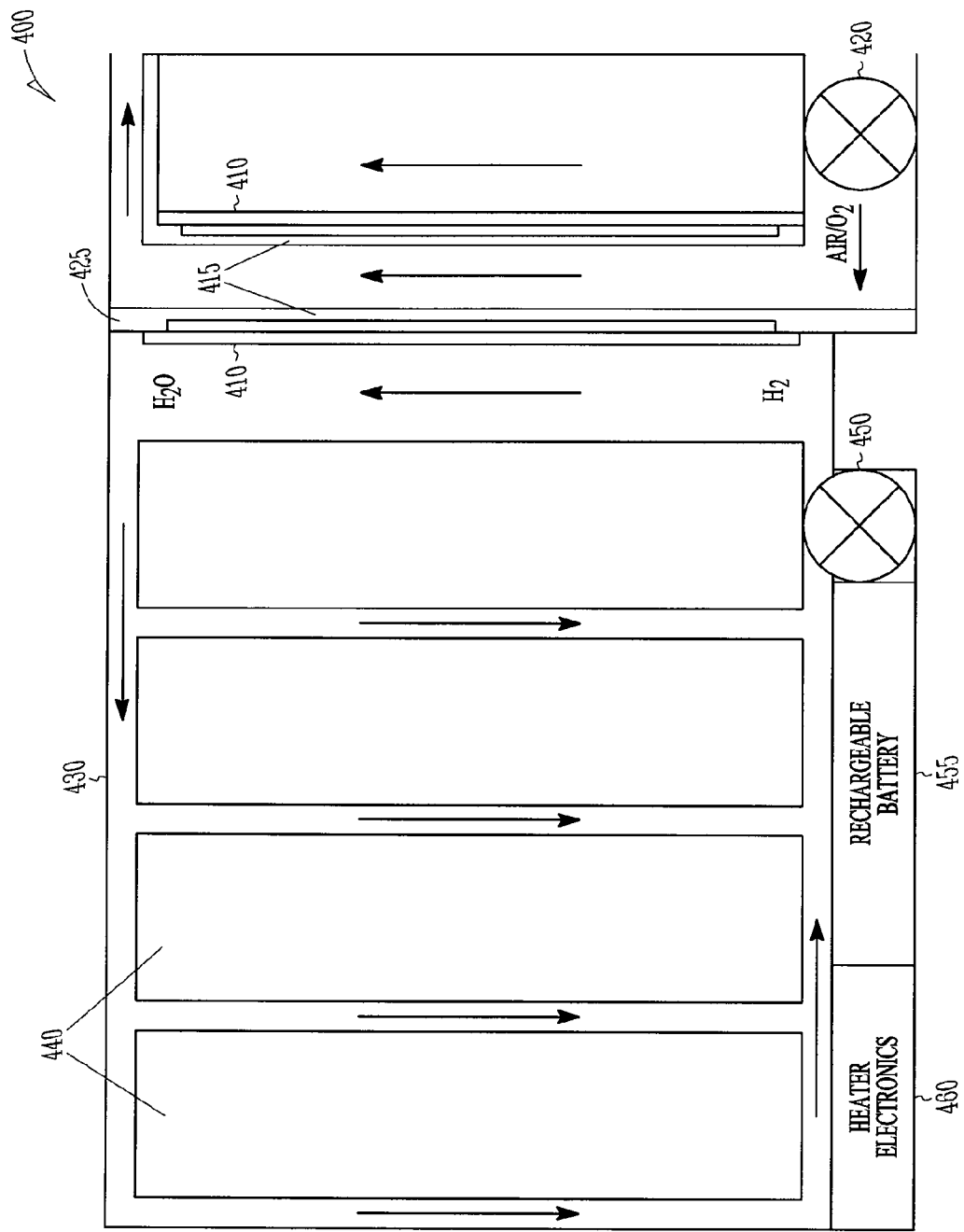
FIG. 4 is a block cross section representation of a further embodiment of a power generator utilizing a solid oxide fuel cell.

FIG. 4 is a block cross section representation of a further embodiment of an active system power generator 400 utilizing a solid oxide fuel cell 410. In one embodiment, solid-oxide fuel cell 410 is cylindrical in shape, with two sides illustrated by reference number 410 shown in FIG. 4. A heater 415 may be coaxially disposed with the fuel cell 410. A fan or pump 420 may be coupled to a source of air or oxygen, and provides for airflow through the tubular shaped fuel cell 410. Oxygen is provided inside the tubular shaped fuel cell 410 to a cathode, and hydrogen is provided on an outside of the tube to an anode. The fuel cell may take other shapes, such as triangular, cylindrical, square, parallel plates, or any other desired shape that allows separation of the anode and cathode to different gas supplies.

The heater 415 is thermally coupled to the fuel cell 410 and serves to heat the air and fuel cell to a desired operating temperature for operation of the solid oxide fuel cell 410. The heater and fuel cell may be mounted on a thermal insulating substrate indicated at 425 in one embodiment, which may in turn be coupled to a container 430 of the power generator 400. In one embodiment several such fuel cell/heater tubes are provided within the power generator, and may be electrically coupled in series or parallel to provide desired output signal levels.

A hydrogen fuel stack 440 is supported within container 430. In one embodiment, the hydrogen fuel stack 440 is formed of a chemical hydride, metal hydride, or other source of hydrogen. The fuel stack may be provided with passages to allow the flow of water vapor and hydrogen within the fuel stack, as well as to and from an anode side of the fuel cell 410. A further pump or fan 450 may be provided to facilitate such flow. In one embodiment, a rechargeable battery 455 may be provided, and may be electrically coupled to the anode and cathode of the fuel cell 410 in order to be recharged. The battery may also be coupled to electronics 460 and to the heater 415 for increasing the temperature of the fuel cell to operating levels during startup. The battery may also be coupled to the fuel cell 410 for being recharged.

In one embodiment, a method of operating a power generator includes heating a solid oxide fuel cell to an operating temperature of at least about 700° C., producing hydrogen from a hydride fuel source by exposing the fuel source to water vapor, combining the hydrogen with oxygen ions in the solid oxide fuel cell to produce water vapor and electricity, and providing the produced water vapor to the hydride fuel source to produce more hydrogen. The solid oxide fuel cell may be heated using the heater proximate the solid oxide fuel cell powered via the battery during startup, and by generated electricity during operation of the power generator.

In one embodiment, oxygen is blown past a cathode of the solid oxide fuel cell and hydrogen and water vapor are blown about the hydride fuel source and an anode of the solid oxide fuel cell.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method of generating electricity, the method comprising:
   providing hydrogen through a water vapor permeable, hydrogen permeable, and liquid water impermeable membrane to an anode side of a solid oxide fuel cell;
   providing oxygen to a cathode side of the solid oxide fuel cell;
   converting the oxygen to oxygen ions;
   combining the hydrogen and oxygen ions to produce water vapor and electricity; and
   providing the water vapor through the water vapor permeable, hydrogen permeable, and liquid water impermeable membrane to a hydrogen generator, wherein the hydrogen generator is disposed on the anode side of the solid oxide fuel cell.

2. The method of claim 1, wherein the hydrogen is provided by exposing a hydrogen containing fuel to the water vapor.

3. The method of claim 2, and further comprising regulating, using the water vapor permeable, hydrogen permeable, and liquid water impermeable membrane, the flow of produced water vapor to the hydrogen containing fuel.

4. A method of operating a power generator, the method comprising:
   heating a solid oxide fuel cell to an operating temperature of at least about 700° C.;
   producing hydrogen from a hydride fuel source by exposing the fuel source to water vapor;
   providing the produced hydrogen through a water vapor permeable, hydrogen permeable, and liquid water impermeable membrane to an anode side of the solid oxide fuel cell;
   combining the hydrogen with oxygen ions in the solid oxide fuel cell to produce water vapor; and
   providing the produced water vapor through the water vapor permeable, hydrogen permeable, and liquid water impermeable membrane to the hydride fuel source to produce more hydrogen, wherein the hydrogen generator is disposed on the anode side of the solid oxide fuel cell.

5. The method of claim 4 wherein heating a solid oxide fuel cell comprises operating a heater proximate the solid oxide fuel cell via a battery.

6. The method of claim 4 and further comprising blowing oxygen past a cathode side of the solid oxide fuel cell and blowing hydrogen and water vapor about the hydride fuel source and an anode side of the solid oxide fuel cell.

7. The method of claim 5, wherein the heater is thermally coupled to the solid oxide fuel cell.

8. The method of claim 1, wherein the hydrogen generator comprises a hydride.

9. The method of claim 1, wherein the hydrogen generator contains at least one material selected from the group consisting of alkali metals, calcium hydride, lithium hydride, lithium aluminum hydride, lithium borohydride, sodium borohydride and combinations thereof.

10. The method of claim 1, further including separating air on the cathode side from the fuel on the anode side using an electrolyte layer disposed between the cathode side and the anode side.

11. The method of claim 6, wherein:
    the cathode side of the solid oxide fuel cell is a porous and electrically conductive ceramic containing cathode; and
    the anode side of the solid oxide fuel cell is a porous and electrically conductive ceramic containing anode.

12. The method of claim 6, wherein the electrolyte layer is electrically insulating and ionically conductive.

13. The method of claim 6, wherein the electrolyte layer includes a zirconium oxide based material.

14. The method of claim 7, wherein:
    the electrolyte layer includes a ceramic material; and
    the anode includes nickel mixed with ceramic material.

15. The method of claim 7, wherein the anode provides mechanical support for the electrolyte layer and cathode.

* * * * *